(12) United States Patent
Saint-Pierre

(10) Patent No.: US 8,525,493 B2
(45) Date of Patent: *Sep. 3, 2013

(54) METHOD AND APPARATUS TO INCREASE EFFICIENCY IN A POWER FACTOR CORRECTION CIRCUIT

(75) Inventor: Roland Sylvere Saint-Pierre, San Jose, CA (US)

(73) Assignee: Power Integrations, Inc., San Jose, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 13/225,237

(22) Filed: Sep. 2, 2011

(65) Prior Publication Data

US 2011/0316491 A1     Dec. 29, 2011

Related U.S. Application Data

(63) Continuation of application No. 12/267,397, filed on Nov. 7, 2008, now Pat. No. 8,040,114.

(51) Int. Cl.
*G05F 1/00* (2006.01)
*G05F 1/652* (2006.01)

(52) U.S. Cl.
USPC .......................................... 323/222; 363/89

(58) Field of Classification Search
USPC ............. 323/205, 207, 222, 232, 282, 283, 323/285, 351; 363/89
See application file for complete search history.

(56) References Cited

U.S. PATENT DOCUMENTS

| | | | |
|---|---|---|---|
| 4,437,146 | A | 3/1984 | Carpenter |
| 4,940,929 | A | 7/1990 | Williams |
| 5,047,912 | A | 9/1991 | Pelly |
| 5,285,367 | A | 2/1994 | Keller |

(Continued)

FOREIGN PATENT DOCUMENTS

| | | |
|---|---|---|
| CN | 1917341 A | 2/2007 |
| CN | 1938932 A | 3/2007 |
| EP | 1 387 476 A1 | 2/2004 |
| JP | 06 153496 A | 5/1994 |

OTHER PUBLICATIONS

"Application Note 42047: Power Factor Correction (PFC) Basics," Fairchild Semiconductor Corp., Rev. 0.9.0, Aug. 19, 2004, pp. 1-11.

(Continued)

*Primary Examiner* — Adolf Berhane
*Assistant Examiner* — Jeffrey Gblende
(74) *Attorney, Agent, or Firm* — Blakely Sokoloff Taylor & Zafman LLP

(57) ABSTRACT

A power factor correction (PFC) controller includes a first integrator coupled to integrate an input current of a PFC converter. A first signal is generated in response to the first integrator to end an on time of a power switch of the PFC converter. A second integrator is coupled to integrate a difference between a constant voltage and an input voltage of the PFC converter. A second signal is generated in response to the second integrator to end an off time of the power switch of the PFC converter. A driver circuit is coupled to vary the switching frequency of the power switch of the PFC converter in response to the first and the second signals and to output a third signal to switch the power switch of the PFC converter to control the input current to be substantially proportional to the input voltage.

13 Claims, 9 Drawing Sheets

(56) References Cited

U.S. PATENT DOCUMENTS

| | | | |
|---|---|---|---|
| 5,313,381 A | 5/1994 | Balakrishnan | |
| 5,446,366 A | 8/1995 | Bassett et al. | |
| 5,461,303 A | 10/1995 | Leman et al. | |
| 5,502,370 A | 3/1996 | Hall et al. | |
| 5,532,918 A | 7/1996 | Mayrand et al. | |
| 5,602,465 A | 2/1997 | Clemente | |
| 5,612,597 A | 3/1997 | Wood | |
| 5,644,214 A | 7/1997 | Lee | |
| 5,734,564 A * | 3/1998 | Brkovic | 363/21.16 |
| 5,742,151 A | 4/1998 | Hwang | |
| 5,747,977 A | 5/1998 | Hwang | |
| 5,804,950 A | 9/1998 | Hwang et al. | |
| 5,867,379 A | 2/1999 | Maksimovic et al. | |
| 5,886,586 A | 3/1999 | Lai et al. | |
| 5,982,639 A | 11/1999 | Balakirshnan | |
| 6,005,781 A | 12/1999 | Balakirshnan | |
| 6,043,633 A | 3/2000 | Lev et al. | |
| 6,049,473 A | 4/2000 | Jang et al. | |
| 6,075,295 A | 6/2000 | Li | |
| 6,198,638 B1 | 3/2001 | Lee | |
| 6,212,079 B1 | 4/2001 | Balakrishnan et al. | |
| 6,227,157 B1 | 5/2001 | Baumgartner et al. | |
| 6,259,614 B1 | 7/2001 | Ribarich et al. | |
| 6,304,462 B1 | 10/2001 | Balakrishnan et al. | |
| 6,313,976 B1 | 11/2001 | Balakrishnan et al. | |
| 6,351,398 B1 | 2/2002 | Balakrishnan et al. | |
| 6,356,464 B1 | 3/2002 | Balakrishnan et al. | |
| 6,366,481 B1 | 4/2002 | Balakrishnan et al. | |
| 6,373,734 B1 | 4/2002 | Martinelli | |
| 6,438,003 B1 | 8/2002 | Balakrishnan et al. | |
| 6,452,366 B1 | 9/2002 | Hwang | |
| 6,462,971 B1 | 10/2002 | Balakrishnan et al. | |
| 6,531,854 B2 | 3/2003 | Hwang | |
| 6,617,805 B2 | 9/2003 | Ribarich et al. | |
| 6,657,417 B1 | 12/2003 | Hwang | |
| 6,728,121 B2 | 4/2004 | Ben-Yaakov et al. | |
| 6,768,655 B1 | 7/2004 | Yang et al. | |
| 6,803,730 B2 | 10/2004 | Nadd et al. | |
| 6,839,247 B1 | 1/2005 | Yang et al. | |
| 6,900,623 B2 | 5/2005 | Yang et al. | |
| 6,903,536 B2 | 6/2005 | Yang | |
| 6,934,168 B2 | 8/2005 | Thiery et al. | |
| 6,952,354 B1 | 10/2005 | Yang et al. | |
| 6,956,336 B2 | 10/2005 | Ribarich | |
| 6,958,920 B2 | 10/2005 | Mednik et al. | |
| 6,967,851 B2 | 11/2005 | Yang et al. | |
| 7,057,440 B2 | 6/2006 | Yang et al. | |
| 7,064,527 B2 | 6/2006 | Adragna | |
| 7,068,016 B2 | 6/2006 | Athari | |
| 7,078,870 B2 | 7/2006 | Bocchiola | |
| 7,088,081 B2 | 8/2006 | Takahashi et al. | |
| 7,116,090 B1 | 10/2006 | Yang et al. | |
| 7,148,664 B2 | 12/2006 | Takahashi et al. | |
| 7,157,886 B2 * | 1/2007 | Agarwal et al. | 323/207 |
| 7,164,590 B2 | 1/2007 | Li et al. | |
| 7,164,591 B2 | 1/2007 | Soldano | |
| 7,180,273 B2 | 2/2007 | Bocchiola et al. | |
| 7,256,569 B2 | 8/2007 | Wu et al. | |
| 7,269,038 B2 | 9/2007 | Shekhawat et al. | |
| RE40,016 E | 1/2008 | Ribarich et al. | |
| 7,616,459 B2 * | 11/2009 | Huynh et al. | 363/21.12 |
| 7,643,322 B1 | 1/2010 | Varga et al. | |
| 7,750,615 B2 | 7/2010 | Jung et al. | |
| 8,040,114 B2 | 10/2011 | Saint-Pierre | |
| 2004/0046683 A1 | 3/2004 | Mitamura et al. | |
| 2004/0113594 A1 | 6/2004 | Athari et al. | |
| 2006/0061337 A1 | 3/2006 | Kim et al. | |
| 2007/0085523 A1 | 4/2007 | Scoones et al. | |
| 2007/0145956 A1 * | 6/2007 | Takeuchi | 323/207 |
| 2007/0159141 A1 | 7/2007 | Shih | |
| 2007/0241730 A1 | 10/2007 | Dow et al. | |
| 2008/0310196 A1 | 12/2008 | Lin | |
| 2009/0115400 A1 | 5/2009 | Hunter | |
| 2009/0206668 A1 * | 8/2009 | Dawes | 307/64 |
| 2010/0067270 A1 | 3/2010 | Odell | |

OTHER PUBLICATIONS

"Application Note AN42009 (ML AN33): ML4824 Combo Controller Applications," Fairchild Semiconductor Corp., Rev. 1.0.3, Feb. 5, 2002, pp. 1-10.

Brown, R. et al., "One Cycle Control IC Simplifies PFC Designs," Proceedings of the Twentieth Annual IEEE Applied Power Electronics Conference and Exposition, vol. 2, Mar. 6-10, 2005, pp. 825-829.

Brown, R. et al., "Application Note AN-1077: PFC Converter Design with IR1150 One Cycle Control IC," Rev. 2.3, Jun. 2005, pp. 1-18, cover.

Buso, S. et al., "Simplified Control Techniques for High-Power-Factor Flyback Cuk and Sepic Rectifiers Operating in CCM," IEEE Transactions on Industry Applications, vol. 36, No. 5, Sep. / Oct. 2000, pp. 1413-1418.

"CM6903A: Low Pin Count PFC / PWM Controller Combo," Champion Microelectronic Corp., Rev. 1.4, Oct. 20, 2008, pp. 1-15.

"FAN4803: 8-Pin PFC and PWM Controller Combo," Rev. 1.2.3, Nov. 2, 2004, pp. 1-12.

"FAN4810: Power Factor Correction Controller," Rev. 1.0.12, Sep. 24, 2003, pp. 1-14.

Hwang, J. et al., "New Universal Control Methods for Power Factor Correction and DC to DC Converter Applications," Proceedings of the Twelfth Annual IEEE Applied Power Electronics Conference and Exposition, vol. 1, Feb. 23-27, 1997, pp. 59-65.

"IR1150(S)(PbF); IR1150I(S)(PbF): μPFC One Cycle Control PFC IC," International Rectifier, Data Sheet No. PD60230, Rev. C, Feb. 5, 2007, pp. 1-16.

"L4981A; L4981B: Power Factor Corrector," ST Microelectronics, Nov. 2001, pp. 1-16.

"L6562A: Transition-Mode PFC Controller," ST Microelectronics, Rev. 3, Aug. 2007, pp. 1-26.

"ML4821: Power Factor Controller," Micro Linear Corporation, May 1997, pp. 1-12.

"ML4824: Power Factor Correction and PWM Controller Combo," Fairchild Semiconductor Corp., Rev. 1.0.6, Nov. 7, 2003, pp. 1-15.

"ML4861: Low Voltage Boost Regulator," Micro Linear Corporation, Oct. 1996, pp. 1-11.

"NCP1651: Single Stage Power Factor Controller," ON Semiconductor, Rev. 7, Jan. 2008, pp. 1-32.

"NCP1652: High-Efficiency Single Stage Power Factor Correction and Step-Down Controller," ON Semiconductor, Rev. 0, Jun. 2008, pp. 1-34.

Rim, G.-H. et al., "A Simplified Analog Converter for Power Factor Correction Converters," IEEE Transactions on Industrial Electronics, vol. 42, No. 4, Aug. 1995, pp. 417-419.

Maksimović, D. et al., "Nonlinear-Carrier Control for High-Power-Factor Boost Rectifiers," IEEE Transactions on Power Electronics, vol. 11, No. 4, Jul. 1996, pp. 578-584.

Smedley, K. et al., "One-Cycle Control of Switching Converters," Proceedings of the 22nd Annual IEEE Power Electronics Specialists Conference, Jun. 1991, pp. 888-896.

Tang, W. et al., "Charge Control: Modeling, Analysis, and Design," IEEE Transactions on Power Electronics, vol. 8, No. 4, Oct. 1993, pp. 396-403.

Zane, R. et al., "A Mixed-Signal ASIC Power-Factor-Correction (PFC) Controller for High Frequency Switching Rectifiers," Proceedings of the 30th Annual IEEE Power Electronics Specialists Conference, vol. 1, Jun. 1999, pp. 117-122.

Zane, R. et al., "Modeling of High-Power-Factor Rectifiers Based on Switching Converters with Nonlinear-Carrier Control," Proceedings of the 27th Annual IEEE Power Electronics Specialists Conference, vol. 2, Jun. 1996, pp. 1105-1111.

Zane, R. et al., "Nonlinear-Carrier Control for High-Power-Factor Rectifiers Based on Up-Down Switching Converters," IEEE Transactions on Power Electronics, vol. 13, No. 2, Mar. 1998, pp. 213-221.

EP 09 17 5287—European Search Report, dated May 10, 2010, (2 pages).

EP 09 17 5256—European Search Report, dated May 11, 2010, (2 pages).

EP 09 17 5256.8—European Office Action mailed Jul. 15, 2010 (6 pages).

CN 200910222203.4—First Chinese Office Action issued Jan. 24, 2013, with English translation (11 pages).
EP 12176287.6—European Search Report, dated Sep. 17, 2012 (3 pages).
EP 12176287.6—European Office Action, dated Jan. 3, 2013 (5 pages).

* cited by examiner

METHOD AND APPARATUS TO INCREASE EFFICIENCY IN A POWER FACTOR CORRECTION CIRCUIT

CROSS-REFERENCE TO RELATED APPLICATION

This application is a continuation of U.S. application Ser. No. 12/267,397, filed on Nov. 7, 2008, now pending. U.S. application Ser. No. 12/267,397 is hereby incorporated by reference.

BACKGROUND

1. Field of the Disclosure

The present invention relates generally to power factor correction circuits in a power supply, and more specifically, the invention relates to increasing efficiency of a power factor correction circuit.

2. Background

Power supplies are typically used to convert alternating current ("ac") power provided by an electrical outlet into usable direct current ("dc") power for an electrical device. One important consideration for power supply design is how efficiently power is delivered to the power supply. To improve power delivery efficiency a power factor correction (PFC) circuit may be used in the power supply. More specifically, a power factor correction circuit attempts to shape the current waveform as closely to the shape of the voltage waveform.

Typically, PFC circuits are designed to include a power switch that is controlled to switch between an off state and on state in order to transform a distorted input current waveform transmitted from the distribution line into a more ideal current waveform that resembles the shape of the input voltage waveform. More specifically, the power switch is coupled to an energy transfer element to transfer energy to the output of the power supply. However, during operation the PFC circuit experiences switching losses that are created in the power switch due to parasitic capacitances. Typically, parasitic capacitance can be defined as an unwanted capacitance that exists between parts of an electrical component due to their proximity to each other. Additional losses are also realized in the energy transfer element.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In one aspect of the present invention, methods and apparatuses disclosed here for explanation purposes use a control technique to increase efficiency in a power factor correction (PFC) circuit. In the following description, numerous specific details are set forth in order to provide a thorough understanding of the present invention. It will be apparent, however, to one having ordinary skill in the art that the specific detail need not be employed to practice the present invention. Well-known methods related to the implementation have not been described in detail in order to avoid obscuring the present invention.

Reference throughout this specification to "one embodiment," "an embodiment," "one example" or "an example" means that a particular feature, structure or characteristic described in connection with the embodiment is included in at least one embodiment or example of the present invention. Thus, the appearances of the phrases "in one embodiment," "in an embodiment," "in one example" or "in an example" in various places throughout this specification are not necessarily all referring to the same embodiment. The particular features, structures or characteristics may be combined for example into any suitable combinations and/or sub-combinations in one or more embodiments or examples.

As will be discussed below, various examples in accordance with the teachings of the present invention implement a control technique for a power factor correction circuit to further increase power efficiency delivery. More specifically, the control technique adjusts the average switching frequency of a power switch in the PFC circuit in response to a varying load coupled at the output of the PFC circuit. In one embodiment of the present invention, the load is representative of a dc-dc converter to be coupled to the output of the PFC correction circuit. This concept will be explained in accordance with the Figures described below.

Figure 1:
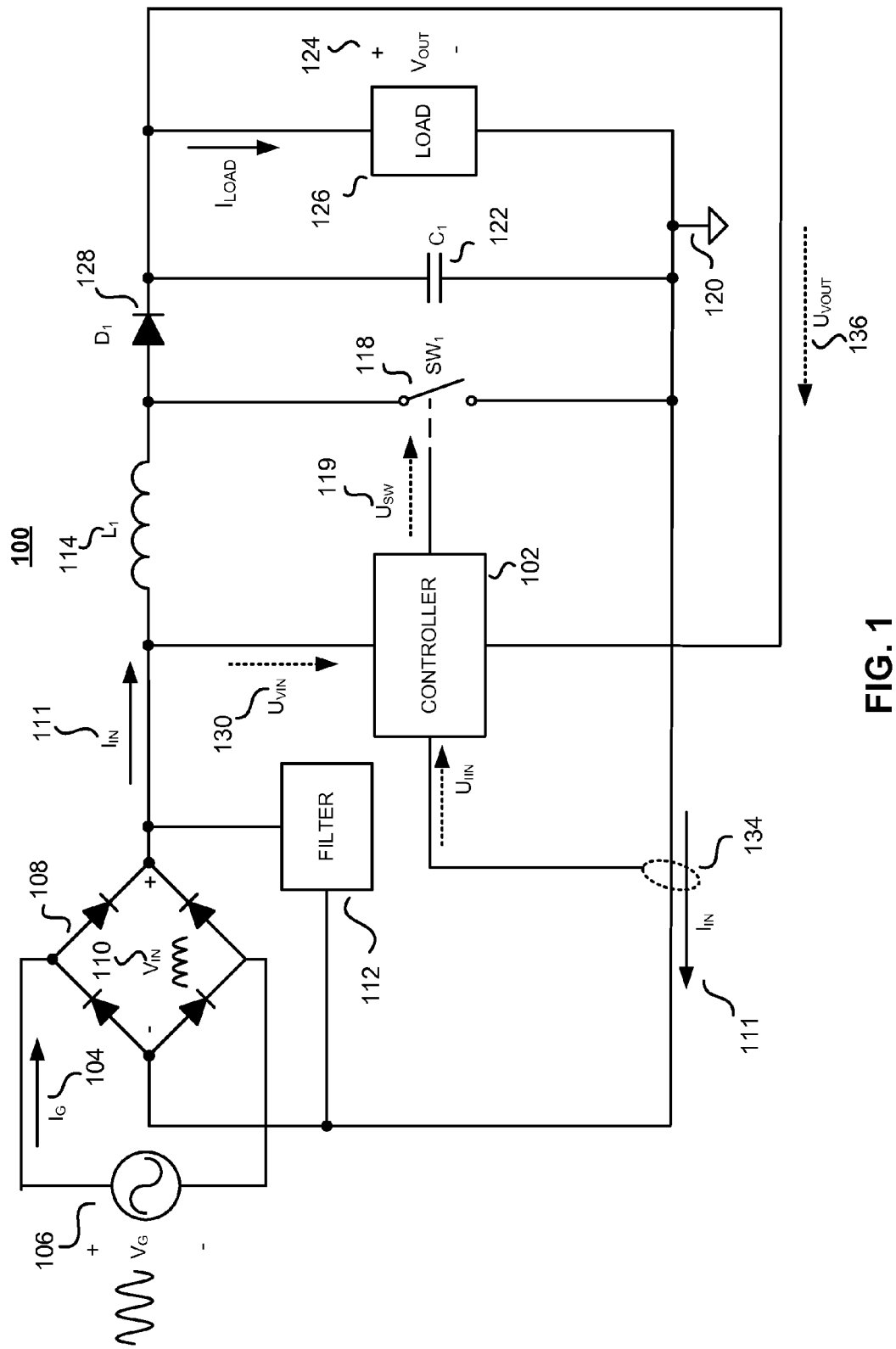
FIG. 1 is a functional block diagram of an example boost converter including an example controller in accordance with the teachings of the present invention.

To illustrate, FIG. 1 is a functional block diagram of an example boost PFC converter 100 (also referred to as PFC converter) including a controller 102 in accordance with the teachings of the present invention. In the example shown, PFC converter 100 is a boost power converter that receives an ac line current $I_G$ 104 which corresponds with an ac line voltage $V_G$ 106. Typically, ac line current $I_G$ 104 and corresponding ac line voltage $V_G$ 106 are provided by an electrical distribution system (e.g., power plant) through an electrical socket). As shown, a bridge rectifier 108 converts ac line voltage $V_G$ 106 to a dc input voltage $V_{IN}$ 110.

Figure 3A:
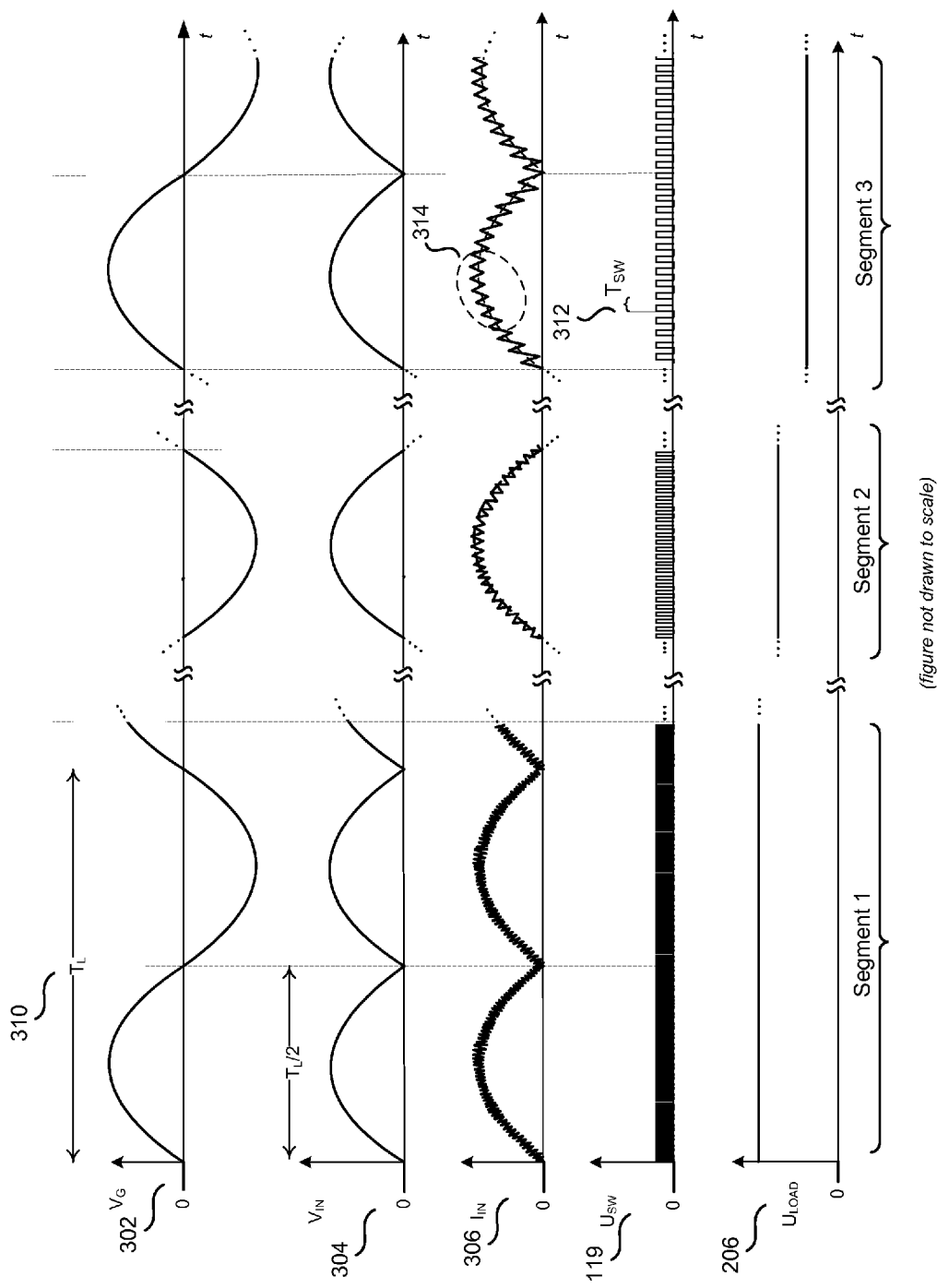
FIG. 3A illustrates example input waveforms associated with FIGS. 1 and 2 and corresponding with a switching signal and a load signal in accordance with the teachings of the present invention.

Referring now to FIG. 3A, example waveforms 302, 304, and 306 are representative of ac line voltage $V_G$ 106, dc input voltage $V_{IN}$ 110, and dc input current $I_{IN}$ 111, respectively. As shown, an 'ac' waveform is denoted by a waveform that reverses its polarity at certain intervals. For example, ac line voltage $V_G$ 106 is represented by waveform 302 that alternates between a positive value and a negative value. In comparison, a 'dc' waveform is denoted by a waveform that is always the same polarity. For example, as illustrated by waveforms 304 and 306, dc input voltage $V_{IN}$ 110 and a dc input current $I_{IN}$ 111 are substantially always positive. Note that dc input voltage $V_{IN}$ 110 (i.e., waveform 304) and dc input current $I_{IN}$ 111 (i.e., waveform 306) vary in magnitude with time.

Referring back to FIG. 1, in the example shown, a filter 112 is coupled across bridge rectifier 108 to filter high frequency noise currents from dc input current $I_{IN}$ 111. In one aspect of the invention, dc input current $I_{IN}$ 111 is substantially controlled to follow the waveform shape of dc input voltage $V_{IN}$ 110. As shown in FIG. 3A waveform 306, representative of dc input current $I_{IN}$ 111, generally follows a shape of waveform 304, representative of dc input voltage $V_{IN}$ 110.

As shown in the example of FIG. 1, one end of an energy storage element, shown as an inductor $L_1$ 114, is coupled to controller 102 while an opposite end of inductor $L_1$ 114 is coupled to a power switch $SW_1$ 118. In operation, power switch $SW_1$ 118 is in an 'on' or 'closed' state when switch 118 is able to conduct current and in an 'off' or 'open' state when switch 118 in unable to conduct current. A switching cycle is defined as a time period when the switch is on and a subsequent time period when the switch is off. For example, a switching cycle may include an on time period when switch $SW_1$ 118 is able to conduct, followed by an off time period when switch $SW_1$ 118 is unable to conduct. In another example, a switching cycle may include an off time period when switch $SW_1$ 118 is unable to conduct, followed by an on time period when switch $SW_1$ 118 is able to conduct. An on-time may be defined as the time period switch $SW_1$ 118 is conducting during a switching cycle and an off-time may be defined as the time period switch $SW_1$ 118 is not conducting during a switching cycle.

In the example of FIG. 1, an input return 120 is coupled to power switch $SW_1$ 118. In operation, the energy storage inductor $L_1$ 114 transfers energy to an output of the power converter 100 in response to the switching of switch $SW_1$ 118 in accordance with the teachings of the present invention. As shown in the example, a bulk capacitor 122 is coupled to supply a substantially constant output voltage $V_{OUT}$ 124 to a load 126. In one example, load 126 may be an input to a dc-dc power supply. A diode D1 128 is coupled such that current from bulk capacitor 122 is prevented from flowing back through inductor $L_1$ 114. In the example of FIG. 1, an input voltage signal $U_{VIN}$ 130, representative of dc input voltage $V_{IN}$ 110, is received by controller 102. An input current sense signal $U_{IIN}$ 132, representative of dc input current $I_{IN}$ 111, is also received by controller 102. More specifically, a current sense 134 such as for example, a current transformer, or a voltage across a discrete resistor, a voltage across a transistor when the transistor is conducting, or a sense FET element couple to a power switch may be used to measure dc input current $I_{IN}$ 111. In the example of FIG. 1, an output voltage signal $U_{VOUT}$ 136, representative of output voltage $V_{OUT}$ 124, is also received by controller 102. In one example, output voltage signal $U_{VOUT}$ 136 may be representative of a constant reference value. In one embodiment of the present invention, sense signals $U_{VIN}$ 130, $U_{IIN}$ 132, and $U_{VOUT}$ 136 may be in the form of a voltage or a current.

In operation, controller 102 outputs a switching signal $U_{SW}$ 119 that controls a switching of switch $SW_1$ 118 in response to the input voltage signal $U_{VIN}$ 130, the input current signal $U_{IIN}$ 132, and/or the output voltage signal $U_{VOUT}$ 136 in order to regulate the output voltage $V_{OUT}$ 124 and control the dc input current $I_{IN}$ 111 to follow the waveform of dc input voltage $V_{IN}$ 110, also referred to as 'input voltage $V_{IN}$ 110.' In one example, controller 102 regulates output voltage $V_{OUT}$ 124 and controls dc input current $I_{IN}$ 111 by varying each switching cycle of switch $SW_1$ 118 also referred to as a variable switching frequency control technique. In another example, controller 102 regulates output voltage $V_{OUT}$ 124 and controls dc input current $I_{IN}$ 111 by maintaining a constant switching cycle of switch $SW_1$ 118 also referred to as a fixed switching frequency control. In one aspect of the present invention, controller 102 also adjusts an average switching frequency of the switch in response to load 124 to further increase efficiency of PFC converter 100. In particular, the average switching frequency is defined as the switching frequency over multiple switching cycles. More specifically, controller 102 employs a control technique that reduces power loss by adjusting an average switching frequency of switch $SW_1$ 118 in response to load 126.

Figure 2:
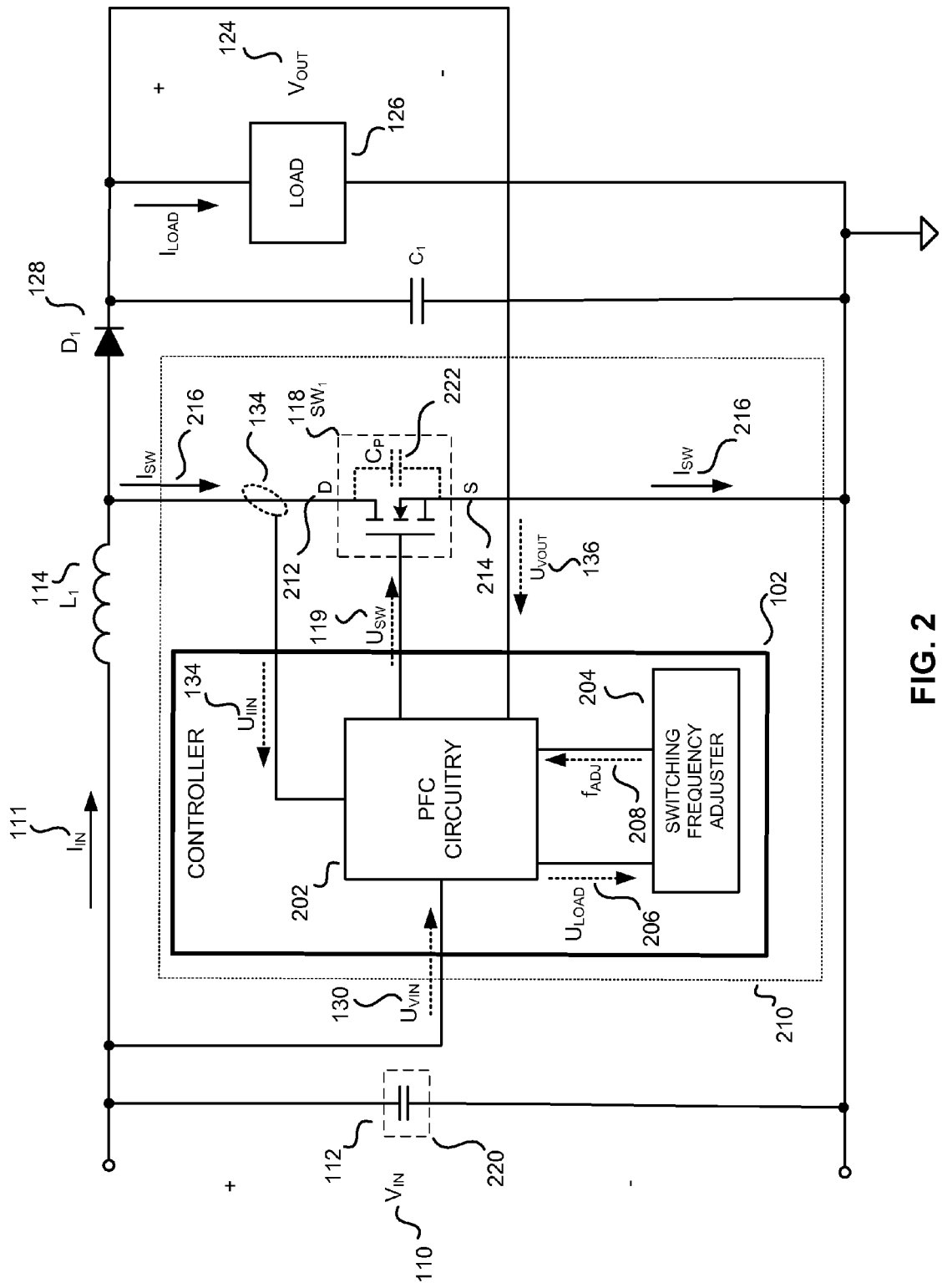
FIG. 2 is a functional block diagram further illustrating the example controller of FIG. 1 in accordance with the teachings of the present invention.

Referring now to FIG. 2, a functional block diagram of power converter 100 further illustrates an example of controller 102 of FIG. 1 in accordance with the teachings of the present invention. As shown, the controller 102 includes power factor correction (PFC) circuitry 202 and an switching frequency adjuster 204. According to the example of FIG. 2, PFC circuitry 202 outputs switching signal $U_{SW}$ 119 and a load signal $U_{LOAD}$ 206 representative of the load 126 coupled to the output of PFC converter 100. PFC circuitry 202 receives input voltage signal $U_{VIN}$ 130, output voltage signal $U_{VOUT}$ 136, and/or input current signal $U_{IIN}$ 134. Switching frequency adjuster 204 receives load signal $U_{LOAD}$ 206 and outputs a frequency adjust $f_{ADJ}$ signal 208.

In operation, as an example, the PFC circuitry 202 regulates an output of the power supply and controls the input current such that the input current $I_{IN}$ 111 follows the waveform of the input voltage $V_{IN}$ 110 in response to input voltage signal $U_{VIN}$ 130, input current signal $U_{IIN}$ 134, and/or output voltage signal $U_{VOUT}$ 136. Switching frequency adjuster 204 outputs frequency adjust signal $f_{ADJ}$ 208 in response to load signal $U_{LOAD}$ 206 and PFC circuitry 202 adjusts the average switching frequency of power switch $SW_1$ 118 in response to frequency adjust signal $f_{ADJ}$ 208.

Figure 3B:
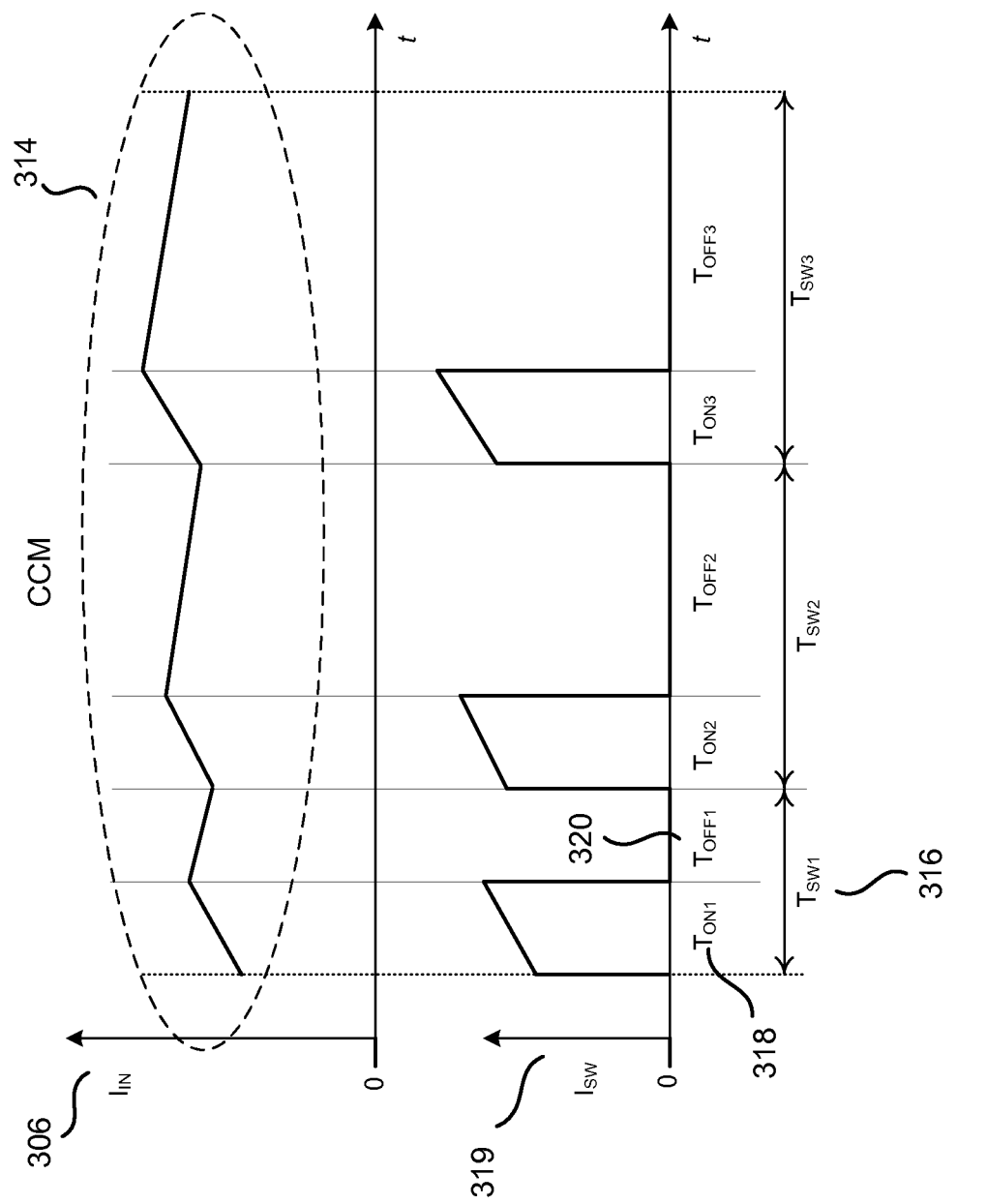
FIG. 3B illustrates a magnified view of one of the input waveforms in FIG. 3A and a corresponding switching waveform.

As shown, controller 102, current sense 134, and switch $SW_1$ 118 may be included in an integrated circuit 210. In one example, switch $SW_1$ 118 may be included on a same single monolithic device as controller 102. In an alternate example, controller 102 may be included on a single monolithic device without switch $SW_1$ 118. In one example, switch $SW_1$ 118 may be a metal oxide semiconductor field effect transistor (MOSFET). In operation, switch $SW_1$ 118 allows conduction of current from a drain terminal 212 to a source terminal 214 when the switch $SW_1$ 118 is on and substantially prevents conduction of current when the switch $SW_1$ 118 is off. In another example, current sense 134 may be coupled to the switch $SW_1$ 118 to measure a switch current $I_{SW}$ 216 as shown. Since switch current $I_{SW}$ 216 is substantially equal to dc input current $I_{IN}$ 111 during the on time of a switching cycle (as shown in FIG. 3B), switch current $I_{SW}$ 216 may be sensed instead of dc input current $I_{IN}$ 111 during the on time of a switching cycle. As shown, current sense 134 may sense input current $I_{IN}$ 111 at the drain terminal 212 of power switch $SW_1$ 118. In an alternative embodiment, current sense 134 may sense input current $I_{IN}$ 111 at the source terminal 214 of power switch $SW_1$ 118. In an alternate embodiment, switch current $I_{SW}$ 216 may be sensed by current sense 134 before drain terminal 212 or after source terminal 214.

As shown, switch $SW_1$ 118 includes parasitic capacitance $C_P$ 222. More specifically, parasitic capacitance can be defined as an unwanted capacitance that exists within parts of an electrical component due to their proximity to each other. In operation, when switch $SW_1$ 118 switches to an off state, parasitic capacitance $C_P$ 222 in PFC converter 100 stores electrical energy. Although, it is shown that stray capacitance $C_P$ 22 is across power switch SW1 118, stray capacitance may be contributing from all components within the PFC controller 100. When switch $SW_1$ 118 switches to an on state, the stored electrical energy within components of PFC converter 100 is discharged and the energy is dissipated in power switch $SW_1$ 118. During operation of controller 100, as the switching frequency of switch $SW_1$ 118 increases and switch $SW_1$ 118 switches more frequently between an on state and an off state, more energy is dissipated in switch $SW_1$ 118. Therefore, it may be beneficial to minimize the switching frequency of switch $SW_1$ 118 whenever possible. In one example, the switching frequency of switch $SW_1$ 118 may be reduced as the load 126 across the output of PFC converter 100 is reduced in order to limit the power dissipation in $SW_1$ 118. However, when limiting the frequency of $SW_1$ 118, losses in energy transfer element $L_1$ 114 are increased. More specifically, as switching frequency of power switch $SW_1$ 118 becomes lower, increases in peak current may generate more power dissipation in the inductor. Additionally, losses in the energy transformer core become larger due to excursion of magnetic flux in the core. Typically, losses in energy transfer element $L_1$ 114 are much greater than the prevented losses in switch $SW_1$ 118 when switching frequency is reduced in a PFC converter. However, in certain PFC converter designs, it may be beneficial to lower the switching frequency since the losses in the power switch are greater than the additional power losses incurred from the energy transfer element $L_1$ 114.

As shown in the depicted example, filter 112 includes, but is not limited to, a capacitor 220 that filters high frequency noise from dc input current $I_{IN}$ 111. More specifically, in one example, a capacitance value of capacitor 220 is a value picked such that capacitor 220 may filter out high frequency noise, but is not large enough to reduce the time varying component of dc input voltage $V_{IN}$ 110. In an alternative embodiment, integrated circuit 210 may be used in PFC converter 100 that includes a flyback converter.

As referenced previously, FIG. 3A illustrates ac line voltage waveform 302, dc input voltage waveform 304, dc input current waveform 306, switch signal $U_{SW}$ 119, and load signal $U_{LOAD}$ 206 according to the teachings of the present invention. The ac line voltage waveform 302 is representative of ac line voltage $V_G$ 106 and is substantially a sinusoidal waveform. A line cycle is defined as the time intervals between three consecutive zero crossings of the ac line voltage waveform 302 and corresponds to a line cycle period $T_L$ 310 which is representative of the time it takes to complete one line cycle. More specifically, in the example shown, the line cycle period $T_L$ 310 is dependent on a frequency of the ac line voltage $V_G$ 106. For example, if the frequency of the ac line voltage $V_G$ 106 increases, the line cycle period $T_L$ 310 will become shorter. Conversely, if the frequency of the ac line voltage $V_G$ 106 decreases, the line cycle period $T_L$ 310 will become longer. According to the embodiments of the present invention, the line cycle period $T_L$ 310 is substantially longer than a switching cycle period $T_{SW}$ 312. To further illustrate, in one example the line frequency is 60 Hz which corresponds to a line cycle period $T_L$ 310 of 16,666 microseconds, and the average switching frequency in segment 1 is 100 kHZ which corresponds to a switching cycle period $T_{SW}$ 312 of 10 microseconds.

As shown, dc input voltage waveform 304 is representative of dc input voltage $V_{IN}$ 110 and is the rectified waveform of the ac line voltage waveform 302. In operation, bridge rectifier 108 rectifies ac line voltage $V_G$ 106, represented by ac line voltage waveform 302, to generate dc input voltage $V_{IN}$ 110, represented by dc input voltage waveform 304. The dc input current waveform 306 is representative of dc input current $I_{IN}$ 111. As shown, the dc input current waveform 306 is superimposed on input voltage waveform 304 to illustrate how dc input current $I_{IN}$ 111 is controlled during the switching cycles to follow dc input voltage $V_{IN}$ 110. A magnified view 314 of the dc input current waveform 306 is shown in FIG. 3B.

As shown in FIG. 3A, an average switching frequency of switching signal $U_{SW}$ 119 varies with the magnitude of signal $U_{LOAD}$ 206. According to the teachings of the present invention, the average switching frequency is adjusted in response to load 126. More specifically, the average switching frequency is defined as the average switching frequency of over at least a half line cycle or more. Therefore, the average switching frequency can be adjusted even when the control scheme of PFC circuitry implements a variable switching frequency. As shown in segment 1, load signal $U_{LOAD}$ 206 is at the highest magnitude and corresponds with switching signal $U_{SW}$ 119 being at the highest average switching frequency. As shown in segment 2, load signal $U_{LOAD}$ 206 is reduced in magnitude and corresponds with switching signal $U_{SW}$ 119 having a lower average switching frequency. As shown in segment 3, the load signal $U_{LOAD}$ 206 is further reduced in magnitude which corresponds with switching signal $U_{SW}$ 119 having an even lower average switching frequency. As shown in FIG. 3A switching input current waveform 306 depicts input current $I_{IN}$ 111 in continuous conduction mode. More specifically, continuous conduction mode is a switching control technique implemented such that the input current $I_{IN}$ 111 is prevented from reaching zero within a switching cycle because switch $SW_1$ 118 turns on before energy in energy transfer element $L_1$ 114 goes to zero. It will be appreciated that since input to PFC converter 100 is an ac signal, that when the input voltage is zero the ac input current will be zero even in continuous conduction mode. A discontinuous conduction mode control technique may be implemented such that the PFC controller 102 prevents input current $I_{IN}$ 111 from going to zero during each off time of each switching cycle. In one embodiment according to the present invention, as the average switching frequency is reduced, PFC controller 102 may switch to a discontinuous mode of operation from a continuous conduction mode of operation. Conversely, when the average switching frequency is increased, input current $I_{IN}$ 111 may go from a discontinuous mode of operation to a continuous mode of operation.

As shown in FIG. 3B, magnified view 314 depicts a portion of input current waveform 306 of FIG. 3A in continuous conduction mode. As shown, dc input current $I_{IN}$ 111 corresponds with switching current $I_{SW}$ 216 during the on time of the switch. In operation input current $I_{IN}$ 111 is controlled for a first switching cycle period $T_{SW1}$ 316 in response to a first on time $T_{ON1}$ 318 and a first off time $T_{OFF1}$ 320 that is determined by controller 102. As illustrated in magnified view 314, switching cycles $T_{SW1}$, $T_{SW2}$, and $T_{SW3}$ are varied due to a variable frequency control technique implemented by controller 102 for PFC correction. Therefore, according to one embodiment of the present invention, controller 102 may adjust the average switching frequency of switch $S_{W1}$ 118 over multiple line cycles in response to varying loads and may also adjust the cycle by cycle switching frequency to regulate the output voltage and control the input current $I_{IN}$ 111 to follow input voltage $V_{IN}$ 110 for PFC.

Figure 4A:
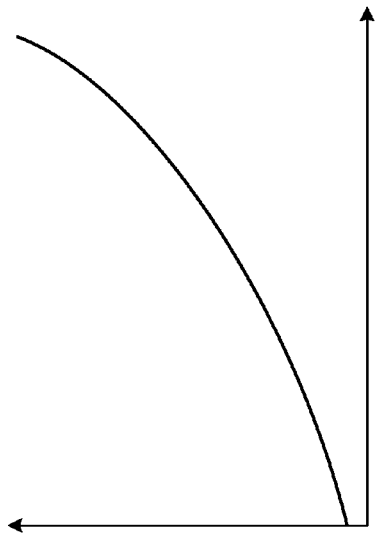
FIG. 4A illustrates an example relationship between load and average switching frequency in accordance with the teachings of the present invention.
Figure 4B:
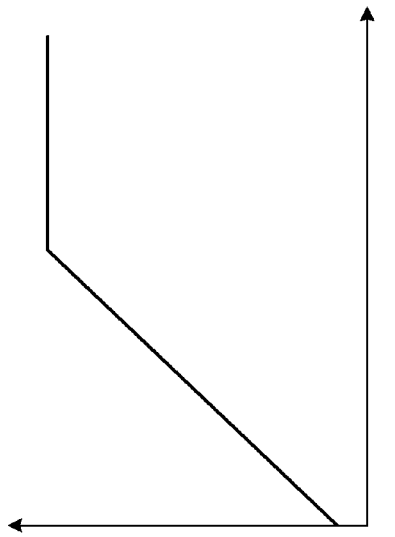
FIG. 4B illustrates an alternate example relationship between load and average switching frequency in accordance with the teachings of the present invention.
Figure 4C:
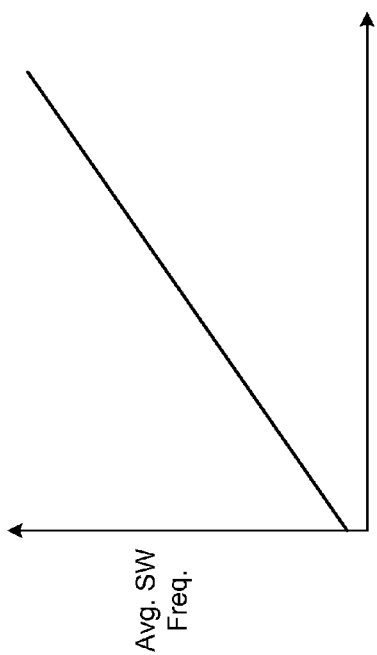
FIG. 4C illustrates an alternate example relationship between load and average switching frequency in accordance with the teachings of the present invention.
Figure 4D:
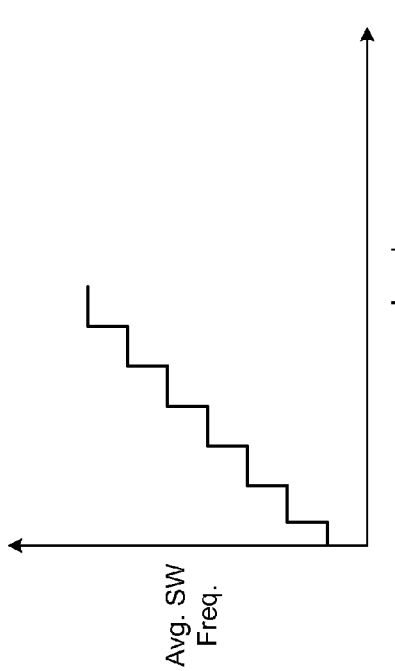
FIG. 4D illustrates an alternate example relationship between load and average switching frequency in accordance with the teachings of the present invention.

Referring now to FIGS. 4A, 4B, 4C, and 4D, the average switching frequency may be adjusted in various ways in response to the load of the PFC converter 100. In FIG. 4A, the average switching frequency of switch $SW_1$ 118 varies linearly and continuously with load 126. In FIG. 4B, the average switching frequency of switch $SW_1$ 118 varies exponentially and continuously with load 126. In FIG. 4C, the average switching frequency of switch $SW_1$ 118 varies linearly and discretely with load 126. According to an embodiment of the present invention and as illustrated in FIGS. 4A, 4B, and 4C, the average switching frequency is adjusted over the entire load range of the boost converter. That is, the average switching frequency may be at a minimum frequency in response to a minimum load condition and the average switching frequency may be at a maximum frequency in response to a maximum load condition of the boost converter. In another embodiment, as shown in FIG. 4D the average switching frequency is adjusted linearly and continuously over a portion of the entire load range. In another embodiment of the present invention, FIGS. 4A, 4B, 4C, and 4D may be combined in any type of combination to determine the relationship between average switching frequency of switch $SW_1$ 118 and load 126.

Figure 5A:
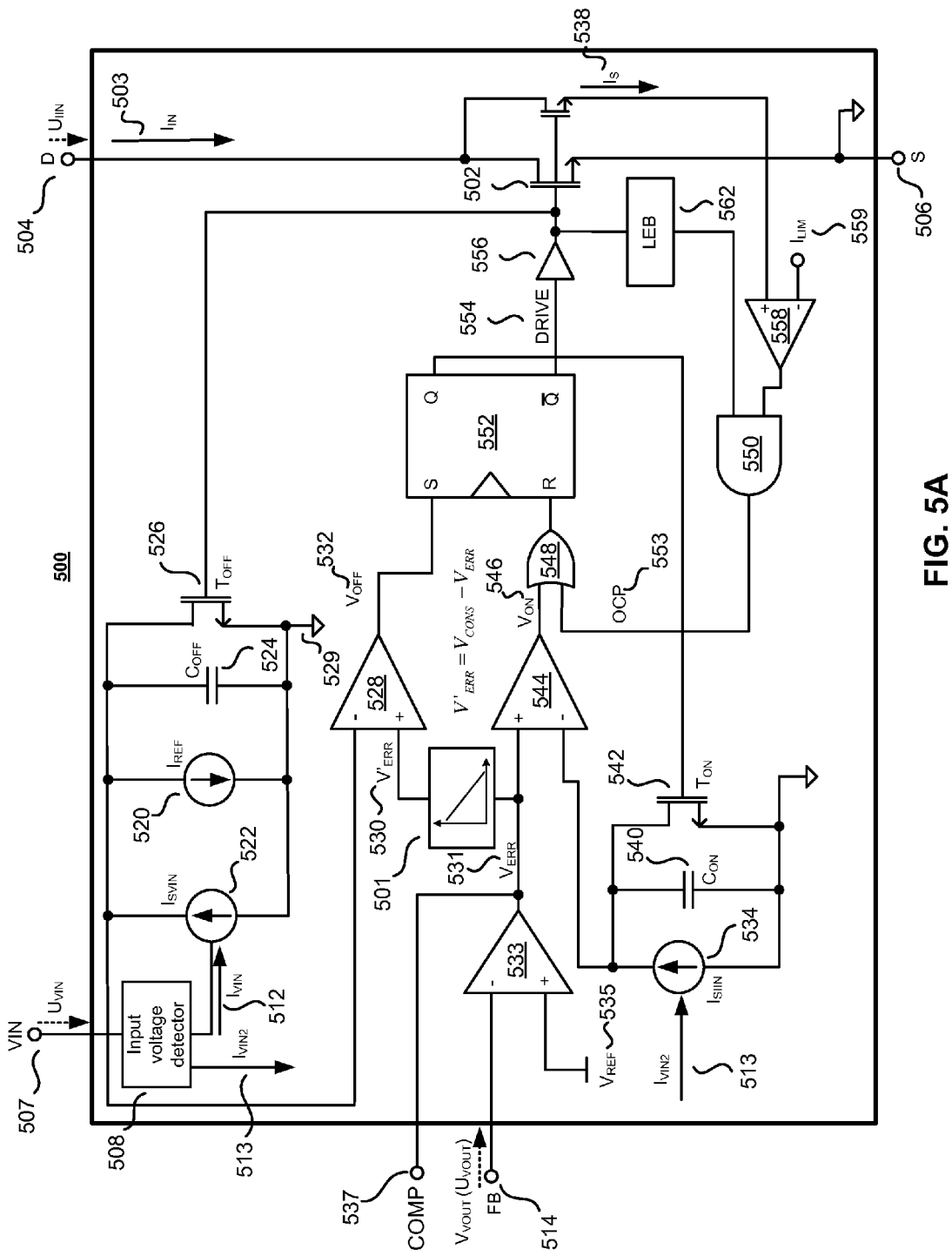
FIG. 5A illustrates an example integrated circuit that implements a control technique for power factor correction (PFC) in accordance with the teachings of the present invention.

Referring now to FIG. 5A, an example integrated circuit controller 500 that uses a particular control technique to implement PFC and further includes a switching frequency adjuster 501 to improve efficiency in accordance with the teachings of the present invention is shown. In the example, a power MOSFET 502 switches between an on state and an off state to permit and prevent a flow of input current $I_{IN}$ 503 between a drain terminal D 504 and a source terminal S 506. A voltage terminal $V_{IN}$ 507 is coupled to receive input voltage signal $V_{IN}$ 110. As shown, an input voltage detector 508 outputs a current MN 512 representative of an instantaneous dc input voltage of PFC converter 100. In operation, a generated current signal $I_{VIN2}$ 513 is derived from input voltage detector 508. According to the teachings of the embodiment in the present invention, generated current signal $I_{VIN2}$ 513 may be representative of a peak input voltage of a half-line cycle, either/or an rms value of the input voltage, either/or an average input voltage over a half cycle. A feedback terminal FB 514 receives a voltage $V_{VOUT}$ representative of an output voltage at the output of PFC converter 100. In one example, voltage $V_{VOUT}$ may be any constant value.

As shown, a reference current $I_{REF}$ flows from a current source 520 in the opposite direction of a scaled current $I_{SVIN}$ which flows from a current source 522. More specifically, scaled current $I_{SVIN}$ is equal to current MN multiplied by a scaling factor for signal processing. A capacitor $C_{OFF}$ 524 is coupled across a transistor $T_{OFF}$ 526. In operation, capacitor $C_{OFF}$ 524 charges when transistor $T_{OFF}$ 526 is off. More specifically, the current that charges capacitor $C_{OFF}$ 524 is the difference between reference current $I_{REF}$ and scaled current $I_{SVIN}$. When transistor $T_{OFF}$ 526 turns on, capacitor $C_{OFF}$ 524 discharges via a common return 529. A voltage comparator 528 is coupled to capacitor $C_{OFF}$ 524 such that a negative terminal of the comparator 528 is at a same potential voltage as the capacitor $C_{OFF}$ 524. When the voltage on capacitor $C_{OFF}$ 524 equals an adjusted error voltage $V'_{ERR}$ 530, a voltage signal $V_{OFF}$ 532 transitions from low to high which results in power MOSFET 502 transitioning to an on state. In this manner, the off time of a switching cycle for power MOSFET 502 is adjusted. In one embodiment of the present invention, capacitor $C_{OFF}$ 524 functions as an integrator that integrates a difference between a constant voltage and an input voltage of a power converter to determine the off time of a switching cycle.

In operation, in the example shown, an error voltage $V_{ERR}$ 531 is an output of error amplifier 533. In operation, error amplifier 533 compares voltage $V_{VOUT}$ with a reference voltage $V_{REF}$ 535 to determine error voltage $V_{ERR}$ 531 which is representative of the output voltage at the output of a power converter. According to an embodiment of the present invention voltage error signal $V_{ERR}$ 531 gives an indication of the output voltage of the power converter 100 and also the load at the output of the controller. According to the teachings of the present invention, the error signal $V_{ERR}$ 531 is designed to have a substantially slower response time in comparison to the switching signal $U_{SW}$ 119 (e.g., drive signal 554). For example, in one embodiment, error signal $V_{ERR}$ 531 is an averaged value representative of an averaged magnitude of output voltage $V_{OUT}$ 124 over several line cycles such that output voltage $V_{OUT}$ 124 is considered a substantially constant value when controlling the input current over a line cycle.

More specifically, in this example, error signal $V_{ERR}$ 531 is substantially non-responsive to ac time variances in the output voltage $V_{OUT}$ 124 over a line cycle. It can also be assumed that error signal $V_{ERR}$ 531 is substantially constant over multiple switching cycles. In one example, error voltage $V_{ERR}$ 531 may be output via a COMP terminal 537 to a gain setting filter that adjusts a response time of error voltage $V_{ERR}$ 531.

As shown in the example, a switching frequency adjuster 501 is coupled between the output of error amplifier 533 and a non inverting terminal of comparator 528. Switching frequency adjuster 501 is one possible implementation of switching frequency adjustor 204 of FIG. 2, while some or all of the remaining circuitry of integrated circuit controller 500 is a possible implementation of PFC circuitry 202. In operation, switching frequency adjuster 501 outputs an adjusted error signal $V_{ERR}$ 530 in response to receiving an error voltage signal $V_{ERR}$ 531. In one example according to the embodiment of the present invention the error voltage signal $V_{ERR}$ 531 is modified based on the following equation:

$$V'_{ERR} = V_C - V_{ERR} \qquad \text{EQ. 1}$$

where $V_C$ is a constant value determined based on design parameters of the feedback loop of PFC converter 100. In accordance with the teachings of the present invention, error voltage signal $V_{ERR}$ 531 can be considered equivalent to load signal $U_{LOAD}$ 206 shown in FIG. 2. More specifically, the magnitude of the error voltage signal $V_{ERR}$ 531 is directly proportional to the load at the output of the power converter. Typically, the magnitude of error voltage signal $V_{ERR}$ 531 may be influenced by a varying input voltage as well as a changing load condition, therefore a directly proportional relationship between the magnitude of the feedback signal $V_{ERR}$ 531 and the load condition at the output of the power converter may be difficult to establish. According to the embodiment of the present invention, input voltage detector generates signal current $I_{VIN2}$ which is representative of an average input voltage value and is multiplied with current source 534 to offset the effects of input voltage on the magnitude of error voltage signal $V_{ERR}$ 531. In other words, current $I_{VIN2}$ is multiplied to current source 534 in a feed forward system such that the magnitude of error voltage signal $V_{ERR}$ 531 is independent of input voltage $V_{IN}$ 111 and may be representative of the load 126 coupled to the output of PFC converter 100. In one embodiment according to the present invention adjusted error signal V'ERR 530 can be considered the equivalent of frequency adjust signal $f_{ADJ}$ 208 in FIG. 2.

In another example embodiment according to the present invention, switching frequency adjuster 501 is coupled between error amplifier 533 and the positive input terminal of voltage comparator 544. In operation of this example the adjusted error signal V'$_{ERR}$ 530 is received by voltage comparator 544.

As shown in the example of FIG. 5A, a current source 534 outputs a scaled current $I_{SIIN}$ that is representative of a sensed input current $I_S$ 538 multiplied by a scaling factor for signal processing. A capacitor $C_{ON}$ 540 is coupled across a transistor TON 542. In operation, scaled current $I_{SIIN}$ charges capacitor $C_{ON}$ 540 when transistor TON 542 is off. When transistor TON 542 is on, capacitor $C_{ON}$ 540 discharges via common return 529. Voltage comparator 544 is coupled to capacitor $C_{ON}$ 540 such that a negative input of the comparator 544 is at the same potential voltage as the capacitor $C_{ON}$ 540. When the voltage on capacitor $C_{ON}$ 540 equals error voltage $V_{ERR}$ 531, a voltage signal VON 546 at an output of comparator 544 transitions from a low signal to a high signal, which results in setting power MOSFET 502 to an off state. In this manner, the on time of a switching cycle for power MOSFET 502 is controlled. In one aspect of the present invention, the capacitor $C_{ON}$ 540 functions as an integrator that integrates an input current of a power converter to determine the on time of a switching cycle.

As shown in the example of FIG. 5A, a first input of an OR gate 548 is coupled to the output of comparator 544 and a second input of OR gate 548 is coupled to an output of an AND gate 550. In operation, OR gate 548 outputs a high signal to reset (R) of latch 552 when the voltage signal VON 546 transitions high or an over current protection (OCP) signal 553 transitions high. In operation, when reset input R of latch 552 receives a high signal, output Q is set high and complementary output $\overline{Q}$ is set low. Conversely, when voltage signal $V_{OFF}$ 532 transitions high, input S of latch 552 sets output Q low and complementary output $\overline{Q}$ is set high. In this manner, complementary output $\overline{Q}$ outputs a drive signal DRIVE 554 that controls a switching of power MOSFET 502. An amplifier 556, amplifies drive signal DRIVE 554 in order to supply adequate current to charge and discharge the gate of power MOSFET 502 to control the switching of power MOSFET 502.

As shown in the example, a current limit comparator 558 compares sensed input current $I_S$ 538 with a current limit reference $I_{LIM}$ 559. In one example, the output of current limit comparator 558 goes high when the sensed input current $I_S$ 538 reaches the current limit reference $I_{LIM}$ 559. More specifically, in this example, sensed input current $I_S$ 538 is a portion of input current IIN 503. In one example, sensed input current $I_S$ 538 is representative of input current IIN 503 in accordance with the teachings of present invention. In one example, drive signal 554 is delayed by leading edge blanking (LEB) circuit 562 before being applied to the input of AND gate 550 to prevent the over current protection signal 553 from indicating a false current limit condition when power MOSFET 502 momentarily discharges stray capacitance as it turns on. More specifically, over current protection signal 553 indicates when the current in power MOSFET 502 has reached the current limit reference $I_{LIM}$ 559, to prevent damage to the power MOSFET 502 and/or any other internal components of integrated circuit 500.

As is discussed above the teachings of the present invention allow a power converter to employ a control technique to shape an input current waveform of the power converter. In addition average frequency adjust circuit 501 is included to adjust the average switching frequency of MOSFET 502 along all load ranges to limit losses in the controller. In the examples discussed, the PFC controller controls the input current waveform to follow the shape of an input voltage waveform by varying an on time and an off time of a power switch in the power converter. More specifically, the input current is controlled to be directly proportional to the input voltage over each half line cycle. However, when the input current is averaged out over multiple half line cycles input current $I_{IN}$ 111 is no longer proportional to the input voltage $V_{IN}$ 110. More specifically, the control technique forces the on time of the power switch to be inversely proportional to a rectified time-varying input voltage $V_{IN}(t)$ by setting a constant volt-seconds for the off time. The off-time is controlled to be a constant product of:

$$(V_{OUT} - V_{IN}) \times T_{OFF} \qquad \text{EQ. 2}$$

In particular, integrating the quantity:

$$V_{OUT} - V_{IN} \qquad \text{EQ. 3}$$

during the off time allows for a constant volt-seconds to be set during the off time. By setting the off time to have a constant volt-seconds, the on-time volt-seconds is forced to be substantially constant over a few switching cycles in order to maintain a volt-second balance that satisfies the properties of a boost inductor. A balance of volt-seconds on the boost inductor allows the on-time to be substantially inversely proportional to the input voltage. This relationship of on-time to input voltage sets up a convenient and simple means for controlling the input current as a function of the rectified time varying input voltage $V_{IN}(t)$ which is representative of the input line voltage. If the input current is sensed by integrating the input current during the on time, the on time can be terminated by reaching a constant integral value of:

$$\int_{T1}^{T2} I_{INPUT} dt \qquad \text{EQ. 4}$$

where the duration from T1 to T2 is the on time as determined by the substantially constant feedback signal over a few switching cycles. This will cause average input current over a switching cycle to be substantially proportional to the input voltage.

Figure 5B:
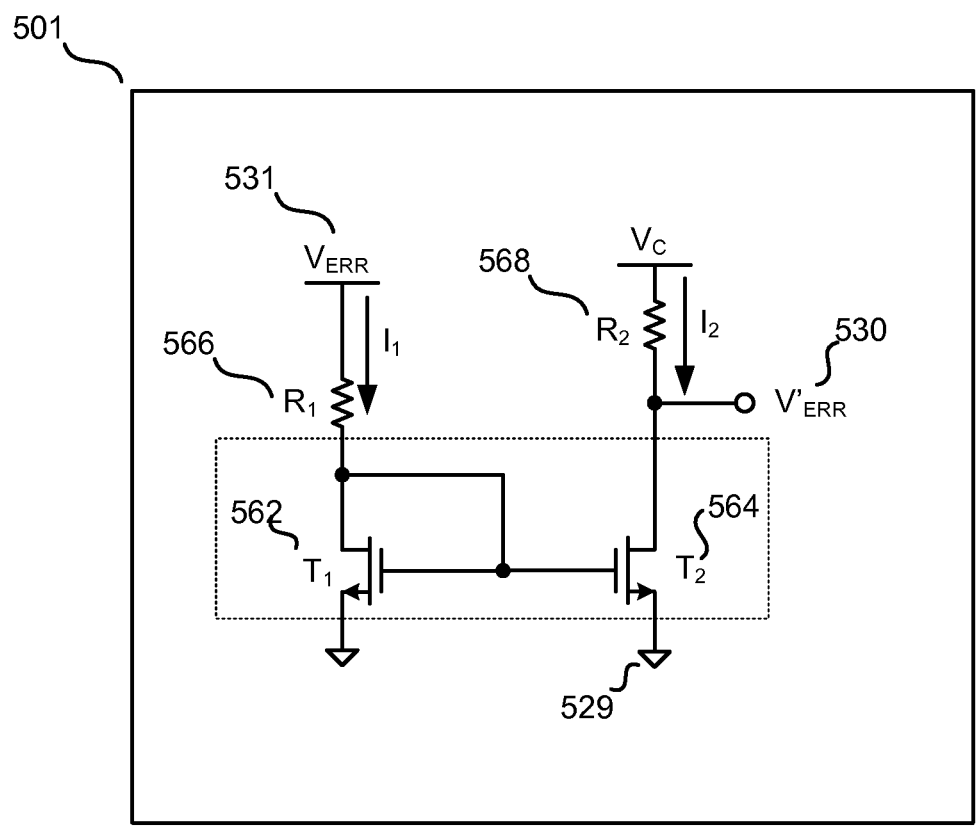
FIG. 5B illustrates an example switching frequency adjuster in accordance with the teachings of the present invention.
Figure 6A:
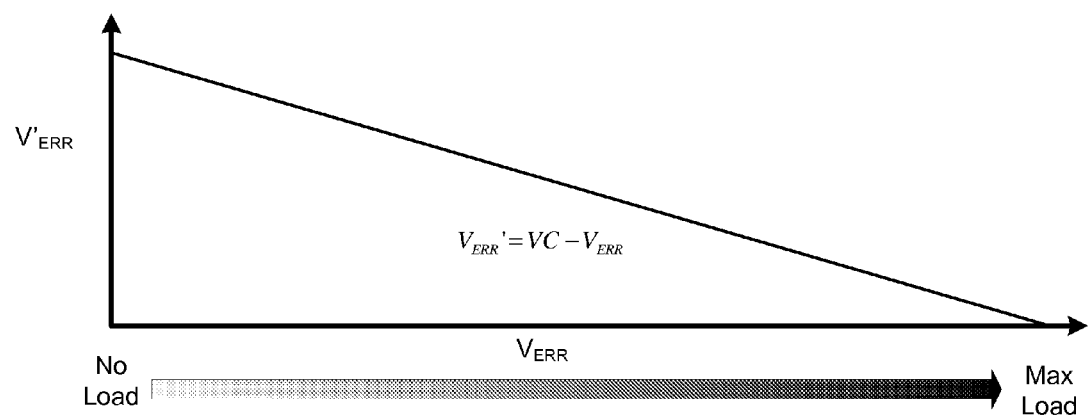
FIG. 6A illustrates an example relationship between an error voltage, an adjusted error voltage, and a load in accordance with the teachings of the present invention.

Referring now to FIG. 5B, an example switching frequency adjuster 501 includes a current mirror 560 in accordance with the teachings of the present invention. As shown, current mirror 560 further includes a gate of a first transistor T1 562 coupled to a gate of a second transistor T2 564. In operation, current mirror 560 receives first current $I_1$ to control a second current $I_2$ through second transistor T2 564. More specifically, error voltage signal $V_{ERR}$ 531 is converted to first current $I_1$ by a first resistor $R_1$ 566 and second current $I_2$ is proportional to first current $I_1$ due to the current mirror configuration. In other words, as first current $I_1$ increases the second current $I_2$ will increase proportionately. A second resistor $R_2$ 568 converts the constant voltage $V_C$, discussed in FIG. 5A, to second current $I_2$. Adjusted error voltage V'$_{ERR}$ 530 is determined. In an example operation, as first current $I_1$ increases due to an increase in error voltage signal V'$_{ERR}$ 530, the second current I₂ increases in proportion. As second current I₂ increases, a voltage drop across second resistor R₂ 568 increases thus reducing the magnitude of the adjust error voltage signal V'$_{ERR}$ 530. According to the embodiment in FIG. 5A, since adjusted error signal V'$_{ERR}$ 530 functions as a threshold to determine the off time, as shown in the example control circuit of FIG. 5A, the adjusted error voltage signal V'$_{ERR}$ 530 adjusts the average switching frequency of the switch by varying the off time of power switch SW₁ 118 during a switching cycle Referring now to FIG. 6A, an example graph 600 further illustrates the functional relationship of adjusted error voltage signal V'ERR 530 as a function of error voltage signal V$_{ERR}$ 531 implemented by average frequency adjuster 501 according to an embodiment of the present invention. In one example, error voltage signal V$_{ERR}$ 531 is representative of load signal U$_{LOAD}$ 206 and adjusted error voltage signal V'$_{ERR}$ 530 is representative of frequency adjust signal f$_{ADJ}$ 208. As shown, the magnitude of voltage error signal V$_{ERR}$ 531 increases as load increases. Conversely, adjusted error voltage signal V'$_{ERR}$ 530 decreases as load increases. As stated above, in one example, a relationship between error voltage V$_{ERR}$ 531, adjusted error voltage V'$_{ERR}$ 530, and a constant voltage V$_C$ is described below:

$$V'_{ERR} = V_C V_{ERR} \qquad \text{EQ. 5}$$

where V$_C$ is a constant voltage that is picked in accordance with the design parameters of the feedback loop in the PFC converter 100. In alternate embodiments according to the teachings of the present invention, graph 600 may resemble other functional relationships or a combination of the other functional relationships between average switching frequency and load as illustrated in FIGS. 4A, 4B, 4C, and 4D.

Figure 6B:
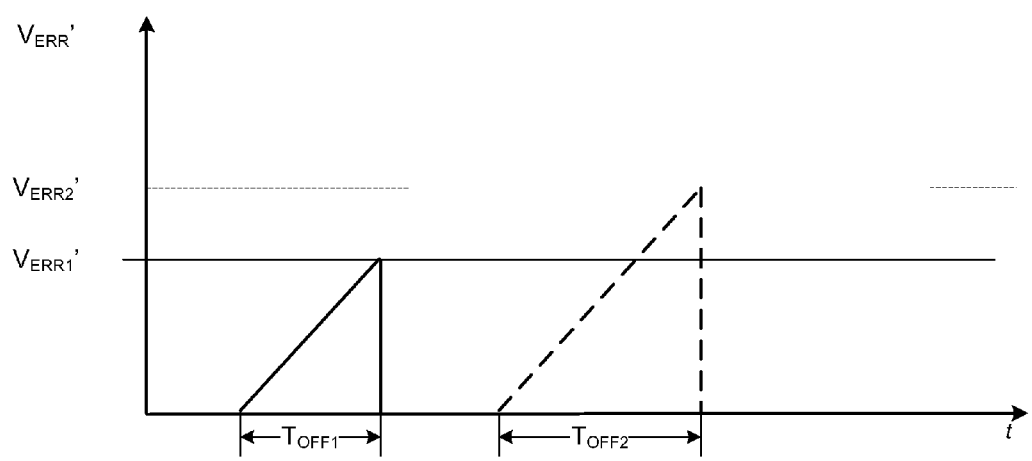
FIG. 6B illustrates an example graph of adjusted error voltages in accordance with the teachings of the present invention.

Referring now to FIG. 6B, a graph 650 illustrates a first adjusted error voltage V'$_{ERR1}$ and a second adjusted voltage V'$_{ERR2}$. As shown, adjusted error voltage V'$_{ERR}$ 530 has an inverse relationship with the load, therefore when the adjusted error voltage V'$_{ERR}$ 530 is increased from V'$_{ERR1}$ to V'$_{ERR2}$ it is representative of a decreasing load at the output of PFC converter 100.

Referring back to FIG. 5, when adjusted error voltage threshold V'$_{ERR}$ 530 increases it will take a longer time for the voltage across capacitor C$_{OFF}$ 524 to meet the increased adjusted threshold and therefore delay the time the MOSFET 502 is turned on again, thus lengthening the off time of the switching cycle. In this manner the average switching frequency is reduced when load 126 at the output of PFC converter 100 is reduced. Due to the control technique implemented in integrated controller 500 the on time of each switching cycle is also stretched so as to maintain to the same duty ratio. Conversely, the average switching frequency can be increased when load 126 increases the adjusted voltage reference coupled to positive terminal of voltage comparator 528 thus reducing the time it takes to charge C$_{ON}$ 540 and leading to a shorter off time.

Figure 7:
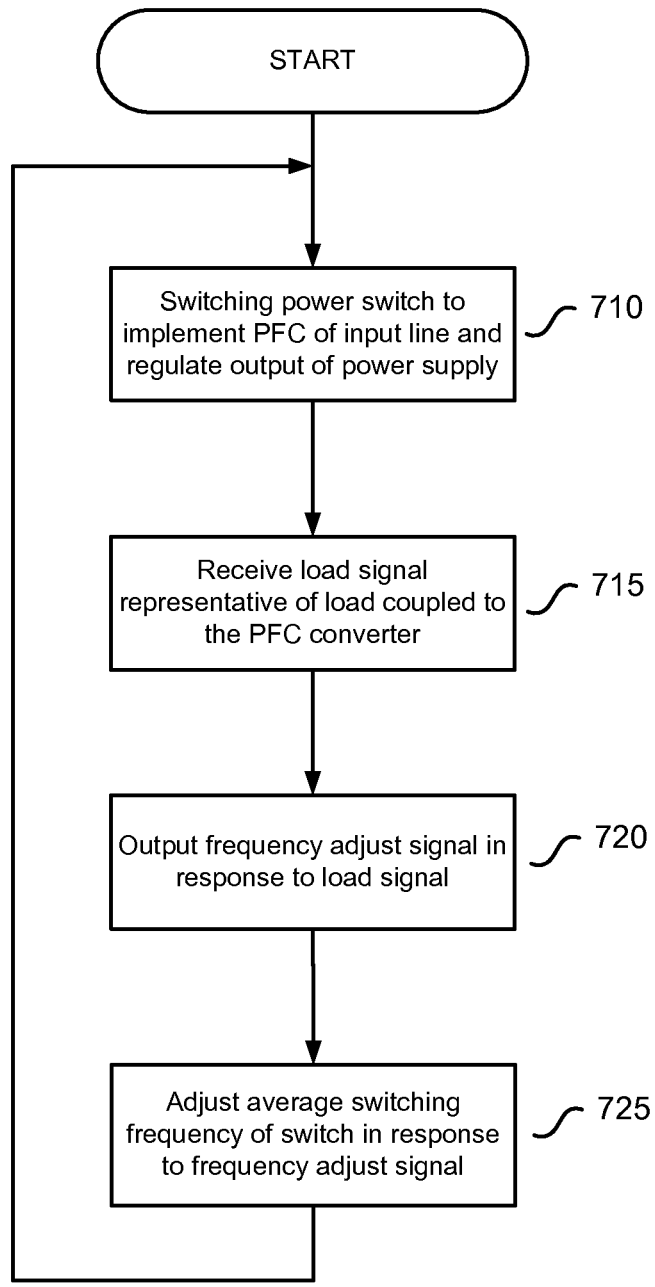
FIG. 7 is a flow diagram illustrating an example method for adjusting the average switching frequency in response to a varying load in a PFC circuit in accordance with the teachings of the present invention.

FIG. 7 is a flow diagram illustrating an example method for adjusting the switching frequency in response to a varying load condition according to the teachings of the present invention. In a process block 710, switch SW₁ 118 is switched to regulate an output voltage and to implement power factor correction such that the input current I$_{IN}$ 111 is directly proportional to the input current V$_{IN}$ 110. In a next process block 715, PFC circuitry 212 outputs a load signal U$_{LOAD}$ 206 representative of load 126 to an average frequency adjuster 204. In a next process block 720, switching frequency adjuster outputs frequency adjust signal f$_{ADJ}$ 208 to PFC circuitry to adjust the average switching frequency in response to the load signal U$_{LOAD}$ 206. In a next process block 725, PFC circuitry adjusts switching signal U$_{SW}$ 119 such that the average switching frequency of power switch SW₁ 1118 is adjusted in response to load 126 coupled to output of PFC converter 100. After execution of decision block 725, the process returns back to process block 710.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed:

1. A power factor correction (PFC) controller, comprising:
a first integrator coupled to integrate an input current of a PFC converter, wherein a first signal is generated in response to the first integrator to end an on time of a power switch of the PFC converter;
a second integrator coupled to integrate a difference between a constant voltage and an input voltage of the PFC converter, wherein a second signal is generated in response to the second integrator to end an off time of the power switch of the PFC converter; and
a driver circuit coupled to vary the switching frequency of the power switch of the PFC converter in response to the first and the second signals and to output a third signal to switch the power switch of the PFC converter to control the input current to be substantially proportional to the input voltage.

2. The PFC controller of claim 1 further comprising a frequency adjust circuit coupled to receive an error voltage signal representative of an output of the PFC converter, wherein the frequency adjust circuit is further coupled to output an adjusted error signal to adjust the end of the off time of the power switch of the PFC converter in response to the error voltage signal.

3. The PFC controller of claim 2 wherein the driver circuit is coupled to regulate an output voltage of the PFC converter.

4. The PFC controller of claim 1 wherein the power switch of the PFC converter comprises a metal oxide field effect transistor (MOSFET).

5. The PFC controller of claim 2 further comprising an error amplifier coupled to generate the error voltage signal in response to a feedback signal representative of the output of the PFC converter and a reference voltage.

6. The PFC controller of claim 1 wherein the first integrator includes a first capacitor coupled to be charged with a scaled current when the power switch is on, wherein the scaled current is representative of the input current.

7. The PFC controller of claim 6 wherein a scaling factor of the scaled current is representative of a peak input voltage of a half-line cycle.

8. The PFC controller of claim 6 wherein a scaling factor of the scaled current is representative of an rms value of the input voltage.

9. The PFC controller of claim 6 wherein a scaling factor of the scaled current is representative of an average input voltage over a half cycle.

10. The PFC controller of claim 6 further comprising a first comparator coupled to compare a voltage on the first capacitor with an error voltage signal representative of an output of the PFC converter and to generate the first signal.

11. The PFC controller of claim 1 wherein the second integrator includes a second capacitor coupled to be charged with a difference between a scaled current and a reference current when the power switch is off, wherein the scaled current is representative of the input voltage.

12. The PFC controller of claim 11 wherein a scaling factor of the scaled current is representative of an instantaneous dc input voltage.

13. The PFC controller of claim 11 further comprising a second comparator coupled to compare a voltage on the second capacitor with an adjusted error signal and to generate the second signal.

* * * * *